(12) United States Patent
Liebig (10) Patent No.: US 7,074,259 B2
(45) Date of Patent: Jul. 11, 2006

(54) METHOD AND APPARATUS FOR THERMAL DEGASSING

(75) Inventor: Erhard Liebig, Laufenburg (DE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 10/798,554

(22) Filed: Mar. 12, 2004

(65) Prior Publication Data
US 2004/0187687 A1 Sep. 30, 2004

Related U.S. Application Data

(63) Continuation of application No. PCT/IB02/03570, filed on Sep. 2, 2002.

(30) Foreign Application Priority Data
Sep. 14, 2001 (CH) .................................. 01701/01

(51) Int. Cl.
B01D 19/00 (2006.01)
F01K 23/10 (2006.01)
(52) U.S. Cl. .................. 95/264; 96/202; 60/39.182; 60/783
(58) Field of Classification Search .............. 95/244, 95/264, 251, 245, 246, 241; 96/218, 202, 96/220, 198, 199; 261/123, DIG. 27, DIG. 75; 122/7 R; 60/39.182, 783
See application file for complete search history.

(56) References Cited

U.S. PATENT DOCUMENTS

| | | | | |
|---|---|---|---|---|
| 1,797,405 A | * | 3/1931 | Elliott | 95/244 |
| 2,677,433 A | * | 5/1954 | Kretzschmar | 95/244 |
| 4,534,774 A | * | 8/1985 | Lecoffre et al. | 95/246 |
| 5,201,366 A | * | 4/1993 | Blangetti et al. | 165/112 |
| 5,340,383 A | * | 8/1994 | Womack | 95/243 |
| 5,476,525 A | | 12/1995 | Bekedam | 55/218 |

FOREIGN PATENT DOCUMENTS

| | | |
|---|---|---|
| EP | 0 359 735 B1 | 3/1990 |
| WO | WO 83/02402 | 7/1983 |

* cited by examiner

*Primary Examiner*—Duane Smith
*Assistant Examiner*—Douglas J. Theisen
(74) *Attorney, Agent, or Firm*—Steptoe & Johnson LLP (57) ABSTRACT

In a process for thermally degassing the water in a steam system, in particular a heat recovery steam generator, which steam system preferably includes at least one steam drum, at least one economizer connected upstream of it, and at least one evaporator, economic, efficient and structurally simple degassing is achieved by virtue of the fact that water is sucked out of at least one water volume, this water is mixed with steam from a steam volume, and the two-phase mixture that is formed flows out into the water volume.

20 Claims, 4 Drawing Sheets

METHOD AND APPARATUS FOR THERMAL DEGASSING

CROSS-REFERENCE TO RELATED APPLICATIONS

This application is a continuation of the U.S. National Stage designation of co-pending International Patent Application PCT/IB02/03570 filed Sep. 2, 2002, the entire content of which is expressly incorporated herein by reference thereto.

FIELD OF THE INVENTION

The present invention relates to a method and apparatus for thermal degassing.

BACKGROUND OF THE INVENTION

The water-steam cycle of a steam power plant or a combined-cycle power plant substantially comprises a boiler or heat recovery steam generator as the steam-generating means, a steam turbine, a condenser, a feedwater vessel/degassing means, as well as pumps and pipes. In this system, there are very high demands imposed on the purity of the working medium, and a special water-chemical procedure is used to lower the levels of corrosion and deposits.

By way of example, to make optimum use of the heat of the exhaust gas from the gas turbine, the heat recovery steam generator of a combined-cycle installation comprises up to three pressure stages for generating steam at different pressure levels. A pressure stage includes an economizer or preheater and an evaporator, and also if appropriate a steam drum and a superheater.

To ensure correct chemical operation of the water-steam cycle, the working medium has to be degassed, which can be carried out, for example, by means of a thermal process. Degassing of the working medium is particularly important if the system was at ambient pressure or had been opened, i.e. in particular after inspection and/or maintenance work or during cold starts. The degassing is also important if large quantities of make-up water are flowing in.

According to the prior art, the thermal degassing takes place either in the condenser, in the feedwater tank/degassing means, or by means of a degassing means which has been fitted to the low-pressure drum. In particular the latter two variants require high investment costs on account of the additional components required. An additional factor in these variants is that they are disadvantageous in terms of energy on account of the need for heating steam in order to heat a liquid which has been slightly cooled by 5–20 K to saturation temperature. The higher the pressure level of the degassing means, the greater this drawback becomes.

With regard to the thermal degassing of the working medium, it should be ensured that the use of heating heat for the degassing procedure takes place in accordance with the prevailing qualitative and quantitative requirements, in order to ensure that the overall efficiency of the installation is reduced as little as possible and only for a limited time.

In this context, reference is made to EP 0 359 735 B1, which proposes a heat recovery steam generator in which the steam drum is provided with an integrated thermal degassing means, and which steam drum, in addition to the function of separating the water-steam mixture, also has the function of storing the feedwater. In other words, the abovementioned document substantially involves avoiding the need for the feedwater tank/degassing means in the water/steam cycle by suitable modification of the steam drum. However, the patent fails to give any details as to how this integrated thermal degassing is configured and as to what means are made available for the degassing. The figure merely shows that the means could be a fitted trickling degassing means.

If the systems are functioning perfectly and if the installations operating in the subatmospheric pressure range are properly sealed, it is not absolutely inevitable that degassing will be required throughout the entire operating time of the installation. For this reason, it is also not sensible to ensure permanent high-quality degassing with high investment costs and a constant power loss. Rather, it is more appropriate to use additional measures to ensure appropriate degassing in the event of special conditions or when time-limited procedures are being implemented, but to operate the installation without this additional degassing during normal operation.

SUMMARY OF THE INVENTION

Accordingly, one object of the invention is to provide a novel process and apparatus of the type described in the introduction which avoids the drawbacks of the prior art and in particular allows economical, efficient and structurally simple degassing, which is characterized by low investment costs, in a steam system of this type, and which is therefore matched to the requirements of the steam system.

The core idea of the invention therefore consists in realizing integrated thermal degassing which is based on the existing two-phase mixture consisting of steam and water being used for the degassing. For this purpose, a two-phase mixture is generated from the steam and water phases which are separately present and this two-phase mixture in turn flows out into the water volume of the steam system. The degassing is to a certain extent ensured by means of system-internal, forced steam-water circulation. This surprisingly simple yet nevertheless efficient form of degassing may also be retrofitted to existing condensers, feedwater vessels, steam drums and other vessels with only minor modifications being required. The simplicity of the solution therefore means that the investment costs are low compared to the standard degassing variants.

According to a first preferred embodiment of the invention, the process is distinguished by the fact that the water is sucked out of the water volume of a vessel by means of at least one pump, i.e. forced circulation is implemented. The water which is sucked out of the water volume may preferably be conveyed through at least one water jet injector operated as a jet pump, steam being sucked out of the steam volume of the steam system by the at least one water jet injector, in order to form the two-phase mixture. A significant advantage of this concept consists in the fact that forced circulation by means of a motor-driven pump only needs to be provided for the water. The steam is sucked in and mixed with the water by means of the water jet injector. Further special equipment to suck up the steam and to mix the steam with the water is not required.

According to a further embodiment of the invention, the steam content of the two-phase mixture which flows out into the water volume of the steam system is in the range from 2 to 5%. It is preferable for the steam bubble diameters and the injection locations to be set in such a manner that the residence time of the steam bubbles in the water is in the range from 5 to 8 sec if the water has to rise over a height of at least 60 cm. The two-phase mixture is advantageously injected into the water volume of the steam system via nozzles, in particular two-fluid nozzles, two-phase nozzles, arranged below the water level, preferably in the vicinity of the base of the vessel, at a particularly expedient pressure of 1 to 2 bar above atmospheric pressure, a multiplicity of nozzles or nozzle tubes preferably being provided in order to achieve more intimate mixing.

If the steam system is a steam system of a heat recovery steam generator, especially a steam system comprising at least one steam drum with at least one evaporator and preferably at least one economizer connected upstream of it, a number of special conditions arise. This applies in particular if the steam volume is the steam volume of the steam drum as the water volume is the water volume of the same steam drum. In addition to separation of the two-phase mixture coming from the evaporator and the degassing of the water, a steam drum of this type can advantageously be used to perform the function of storing the feedwater.

According to a further preferred embodiment of the process, the steam drum is a low-pressure steam drum, in particular a steam drum of a forced circulation evaporator with a steam content in the range from 10 to 15% at the outlet of the evaporator.

A further preferred embodiment of the process is distinguished by the fact that the functions of the degassing and separation of steam and water which are to be performed inside the steam drum are physically separated by a corresponding arrangement of both the nozzles and the inlets leading from the evaporator. The steam drum then has a water feed, an inflow connection for water to the evaporator and a backflow connection for water and steam from the evaporator, a steam outlet and a gas outlet. The two-phase mixture flows via nozzles, preferably on the side of the gas outlet, into the water volume, and the two-phase mixture which comes from the evaporator is preferably introduced into the steam drum on the side of the steam outlet.

A preferred embodiment of an apparatus for carrying out the process is distinguished by the fact that the feedwater inlet from the economizer and the feedwater outlet on the steam drum are arranged opposite one another, with additional flow obstacles, chicanes, advantageously being arranged in the water volume, these obstacles promoting intimate mixing of the water and preventing it from flowing directly through the steam drum. Similarly, the gas outlet and the steam outlet can be arranged opposite one another on the steam drum, in which case in particular additional equipment is fitted in the steam volume, promoting directional outgoing flow of the expelled gases and of the steam which is generated.

According to a further preferred embodiment of the invention, the evaporator is arranged in the heat recovery steam generator through which hot exhaust gases from an exhaust-gas generator flow, and the system comprising exhaust-gas generator and heat recovery steam generator is controlled in such a manner that the generation of steam in the evaporator corresponds to the degassing requirements. The steam losses are reduced or avoided by a special procedure of this nature.

The same objective of reducing or avoiding steam losses can be achieved by partial or complete bypassing of the economizer. As a result of significantly supercooled water passing into the steam drum, the steam which is generated in the evaporator is partially or completely consumed in order to preheat the feedwater. The system comprising evaporator and steam drum then operates partially or completely as a preheater.

Moreover, under the condition of degassing not being required, the circulation system, for example the injector system, for thermal degassing of the water of the steam system can be switched off; the circulation pump does not operate under these circumstances.

Further preferred embodiments of the process according to the invention and the apparatus for carrying out the process are described in the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
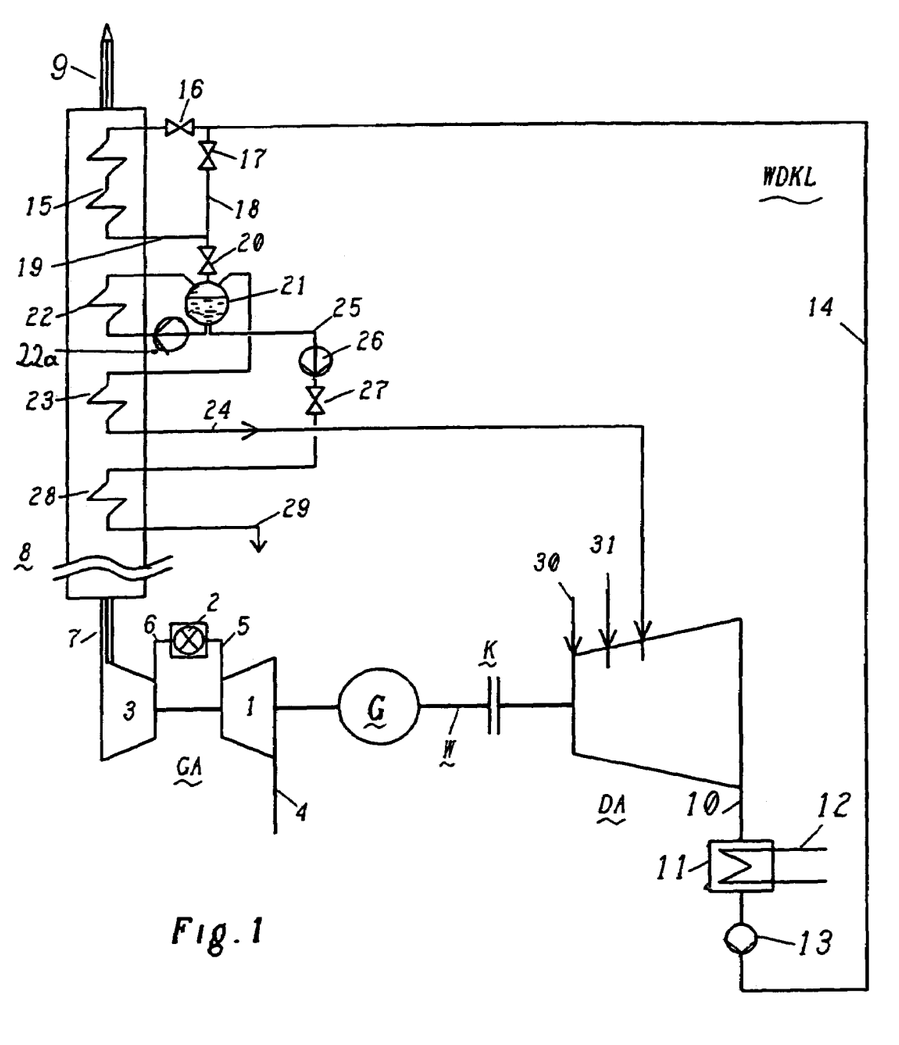
FIG. 1 diagrammatically shows a combined-cycle power plant.

Referring now to the drawings, wherein like reference numerals designate identical or corresponding parts throughout the several views, FIG. 1 diagrammatically depicts a combined-cycle power plant, on the basis of which the configuration of the degassing in accordance with the invention is to be explained. In the present exemplary embodiment, to describe the apparatus and the process, in some places identical reference symbols are used, for example, for a line (e.g. feedwater line) and the medium which flows inside it (e.g. feedwater). However, the person skilled in the art will recognize these differences without problems from the context in which they are used.

The installation illustrated in FIG. 1 is, by way of example, what is known as a single-shaft installation, in which the gas turbine assembly GA and steam turbine assembly DA together with the generator G are located on a single shaft W. The generator G is arranged between the gas turbine assembly GA and steam turbine assembly DA. An automatically acting coupling K is arranged in the shaft section between steam turbine assembly DA and generator G and ensures transmission of forces when the steam turbine is running at least synchronously with the generator and the gas turbine assembly.

In a combined-cycle power plant, the heat which is contained in the exhaust gas 7 from the gas turbine assembly GA is used to generate steam in a heat recovery steam generator 8. The water which is fed to the heat recovery steam generator 8 is preheated in this heat recovery steam generator 8, evaporated and superheated if necessary. The steam which is generated in the heat recovery steam generator 8 is used to drive the steam turbine assembly DA. The steam which is expanded in the steam turbine assembly DA, exhaust steam 10, is condensed in the condenser 11 and fed back to the heat recovery steam generator 8.

In the present example, the gas turbine assembly GA comprises a compressor 1, a combustion chamber 2 and a turbine 3. In the gas turbine assembly GA, intake air 4 is compressed in a compressor 1 then fed as combustion air 5 to the combustion chamber 2, the hot gas 6 which is formed there is passed to the turbine 3 and treated. The exhaust gas 7 from the gas turbine assembly is fed to the heat recovery steam generator 8, where it is used to generate steam for operating the steam turbine assembly DA. Downstream of the heat recovery steam generator 8, the exhaust gas 7 is released to the atmosphere via a stack 9.

The term gas turbine assembly GA encompasses the compressor 1, the combustion chamber 2 and the turbine 3. A gas turbine assembly may have a plurality of combustion chambers and a plurality of turbines. For example, in the case of gas turbine assemblies with sequential combustion, a low-pressure combustion chamber with a low-pressure turbine is connected downstream of a high-pressure combustion chamber with high-pressure turbine. It is also possible for a gas turbine assembly to have a plurality of compressors.

In the present case, the steam turbine assembly DA is illustrated in simplified form as a steam turbine. It may quite easily be a multi-casing installation of numerous possible designs, comprising high-pressure, medium-pressure and low-pressure sections.

The heat recovery steam generator 8 is fed from the condenser 11 by means of the condensate pump 13 via the feedwater line 14 leading into the low-pressure (LP) preheater or economizer 15. In this case, the control element 16 in the feedwater line 14 is open and the control element 17 in the bypass line 18 is closed. The feedwater which is conveyed into the heat recovery steam generator 8 by means of the condensate pump 13 is at a temperature of typically 20 to 45° C. (water-cooled condenser) or 30 to 55° C. (air-cooled condenser).

In the heat recovery steam generator 8, the feedwater is preheated in the low-pressure economizer 15. The feedwater which has been preheated in the low-pressure economizer 15 is fed to the low-pressure steam drum 21 via the feedwater line 19 and the control element 20. The low-pressure steam drum 21 is in communication with the low-pressure evaporator 22. Furthermore, the low-pressure steam drum 21 is followed by a low-pressure superheater 23, to which the low-pressure live steam line 24, which leads to the steam turbine assembly DA, is connected.

Feedwater 29 can be conveyed from the low-pressure steam drum 21 to further pressure stages of the heat recovery steam generator 8 by means of a further feedwater pump 26 and via a further feedwater line 25, a further control element 27 and a further economizer 28. In this case, the low-pressure steam drum 21 performs the additional function of the feedwater vessel. The steam which is generated in the further pressure stages of the heat recovery steam generator 8 is fed to the steam turbine assembly DA via the corresponding high-pressure (HP) and medium-pressure (MP) live steam lines 30, 31. The steam is expanded in a work-performing manner in the steam turbine assembly DA. The exhaust steam 10 from the team turbine assembly DA is condensed in the condenser 11. The condensate is fed back to the heat recovery steam generator 8 by means of the condensate pump 13 via the feedwater line 14.

Alternatively, it is also possible for further pressure stages of the heat recovery steam generator 8 to be fed direct from the condenser 11.

The low-pressure economizer 15, the low-pressure steam drum 21, the low-pressure evaporator 22 and the low-pressure superheater 23 together form a low-pressure steam system operating at one pressure stage.

The pipe systems which are provided for transferring heat from the exhaust gas 7 from the gas turbine assembly to the feedwater or the steam in the heat recovery steam generator 8 (i.e. the economizer, evaporator, superheater) are referred to as heating surfaces.

The present case describes a heat recovery steam generator having a drum forced circulation evaporator. Therefore, the feedwater which is preheated by the economizer is delivered into the steam drum. The drum water is circulated in the steam drum/evaporator system and in the process a proportion of it is evaporated. The two-phase mixture which comes from the evaporator usually enters directly into the drum water or runs out into the drum water via primary separators. Water and steam are separated in the steam drum. Therefore, the steam drum comprises a water volume and a steam volume. Steam drums are usually cylindrical vessels lying on their sides. A large water surface area is advantageous for the separation of steam and water. Therefore, in normal operation, the water level is located approximately in the middle of the drum. The water is fed back to the evaporator, while the steam passes to the steam turbine assembly, either directly or via an optional superheater. The flow through the evaporator may be configured as natural circulation or forced circulation. However, the individual pressure stages of the heat recovery steam generator may also be designed in accordance with the principle of the forced once-through evaporator.

The described and illustrated arrangement of the low-pressure economizer 15 at the exhaust-gas end of the heat recovery steam generator 8 and the fact that there is no separate feedwater vessel/degassing means are typical of a gas-fired gas turbine assembly. To avoid dew point corrosion at the exhaust-gas end of the heat recovery steam generator 8 when switching over to the fuel oil, it is possible to bypass the low-pressure economizer 15. This is achieved by opening the control element 17 in the bypass line 18 and closing the control element 16 in the feedwater line 14.

Of course, further systems (not mentioned here) may additionally be present within the water/steam cycle WDKL, such as for example a recirculation system, with which the person skilled in the art will be entirely familiar, for increasing the condensate-side inlet temperature into the ND economizer 15 in order to prevent corrosion on the exhaust gas side caused by the gases dropping below the dew point in the case of very low feedwater temperatures or in the case of oil firing.

After it has flowed through the heat recovery steam generator 8, the exhaust gas 7 finally escapes to the open air via a stack 9.

Since in the present exemplary embodiment a feedwater vessel/degassing means is not present, the condensate pump 13 represents the interface between the condensate system and the feedwater system. For this reason, the mass flow up to entry into the condensate pump 13 is referred to as condensate. The mass flows downstream of the outlet from the condensate pump 13 are then referred to as feedwater.

In the exemplary embodiment described here, the degassing of the feedwater takes place in the low-pressure steam drum 21.

Figure 2:
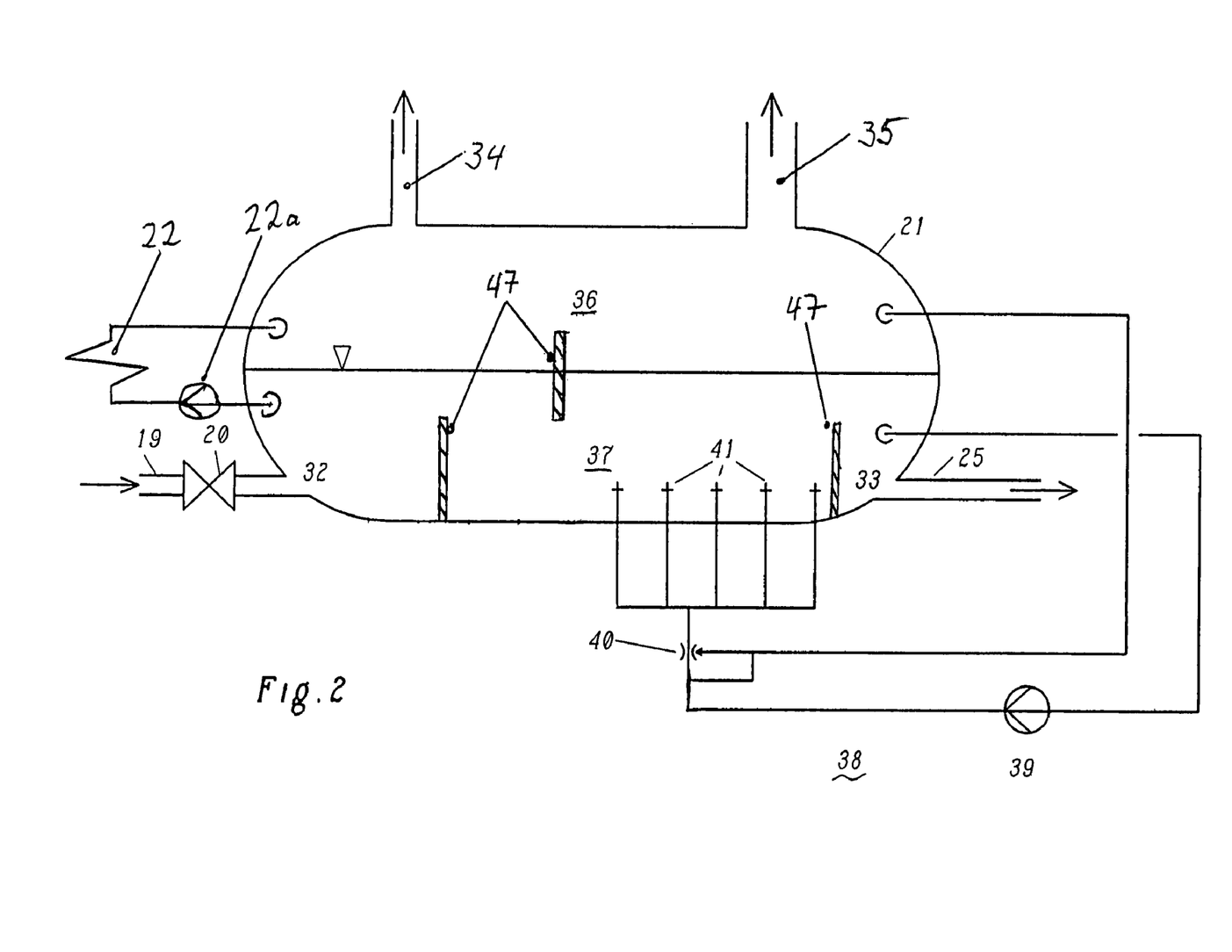
FIG. 2 shows a longitudinal section through the low-pressure steam drum with means for thermal degassing.

The process for degassing in the low-pressure steam drum 21 is explained in more detail on the basis of the longitudinal section through the low-pressure steam drum 21 illustrated in FIG. 2. The feedwater which arrives from the low-pressure economizer 15 via the feedwater line 19 and the control element 20 passes via the feedwater inlet 32 into the steam drum 21. The feedwater which is delivered to the further pressure stages of the heat recovery steam generator 8 via the feedwater line 25 emerges from the LP steam drum 21 via the feedwater outlet 33. Flow obstacles, chicanes, 47 are arranged in the flow path of the water from the inlet 32 to the outlet 25, preventing it from flowing directly through the drum and making mixing of the water in the water volume 37 of the drum more intensive. Furthermore, water is conveyed into the low-pressure evaporator 22 by a recirculation pump 22a. The medium flowing back is separated into steam and water in the drum. The separated steam flows to the steam outlet 34, via steam dryers or dehumidifiers, which are not shown but with which the person skilled in the art will be familiar, and from there to the low-pressure superheater.

It is customary for various chemicals to be present in defined quantities in the water inside the drum 21 in order to prevent or reduce corrosion and deposits.

In the present case, the thermal degassing of the drum water is based on a decreasing gas solubility as the temperature rises at constant pressure. The gas solubility in the saturated state is zero. To expel the gases from the drum water as completely as possible, the water should as far as possible be at saturation temperature and moreover should be thoroughly mixed. To improve the discharge of the gases from the drum water, this water should have the largest possible surface area with respect to the steam. This is achieved by providing the largest possible standing surface of water or by using suitable measures to distribute the water within the steam or the steam within the water.

Under normal operating conditions, the water in the low-pressure steam drum 21 is in the saturated state. This means that the temperature condition relating to the degassing is satisfied.

In order, furthermore, to intimately mix the entire volume of water and to achieve the maximum possible surface area between water and steam, steam is distributed as finely as possible through the water volume 37 by means of a nozzle system in accordance with the principle of "distribution of steam in water". This is realized by means of the water-driven jet injector system 38. By means of one or more pumps 39, water is sucked out of the water volume 37 of the drum 21 and pumped through one or more water jet injectors 40 acting as a jet pump. By means of one or more water jet injectors 40, steam is sucked out of the steam volume 36 of the LP steam drum 21. The mixture of water and steam is introduced into the water volume 37 via one or more two-fluid nozzles 41. With a steam content of preferably 2 to 5% in the mixture, the one or more two-fluid nozzles ensure steam bubbles with an advantageous size and therefore ensure a large surface area between water and steam.

The term two-fluid nozzle 41, which is also employed below, is a term with which those skilled in the art will be entirely familiar. Since a water-steam mixture is not a mixture of two different substances or fluids, but rather a mixture of two phases of a single substance or fluid, the term two-phase nozzle would be a technically precise designation.

The rate at which the steam bubbles rise after they have left the two-fluid nozzle 41, the steam bubble diameter, the height of the water level, etc., are dependent in one another in accordance with complex relationships. A steam bubble diameter which ensures a residence time of the steam bubbles in the water of 5 to 8 seconds if they have to rise over a height (height difference between two-fluid nozzle 41 and water surface) of more than 0.6 m, is advantageous for the degassing and to ensure that the steam bubbles rise upward. Excessively large steam bubbles should be avoided, since they reduce the surface area and rise too quickly. Steam bubbles which are too small cause foaming and should therefore likewise be avoided. The two-fluid nozzles 41 are preferably operated at a pressure of 1 to 2 bar above atmospheric pressure. Dissolved gases are expelled from the water and discharged via the gas outlet 35 by the steam flowing through the water, which is already at boiling point or only just below it.

In the example illustrated, to reduce steam losses in the steam drum, the functions of degassing and separation of steam and water are designed to be physically separate by means of a suitable arrangement of the nozzles 41 on the side of the gas outlet 35 and the means for introducing the two-phase mixture coming from the evaporator 22 into the steam drum on the side of the steam outlet 34. The arrangement of feedwater inlet 32 and feedwater outlet 33 as well as gas outlet 35 and steam outlet 34 illustrated, in combination with the flow obstacles 47 in the water volume 37, as well as equipment in the steam volume 36 from the feedwater inlet side 32 to the feedwater outlet side 33 and in the water volume 37 and also in the steam volume 36 also leads to a reduction in the levels of gases. In particular if further steam systems or pressure stages are fed from the low-pressure steam drum 21, i.e. the drum 21 also performs the function of a feedwater reservoir, it is possible to effect controlled mixing of the water which is present in the water volume 37 by means of flow obstacles arranged therein. Feedwater is prevented from flowing directly through the steam drum 21 from the feedwater inlet 32 to the feedwater outlet 33, which increases the residence time of the water in the steam drum 21 and therefore the degassing effect.

On account of the design and configuration of the jet injector system 38, in particular the arrangement of the nozzles 41 in the water volume 37, and the arrangement of the pipelines from the low-pressure evaporator 22, it is possible, in combination with equipment arranged in the steam volume 36, to bring about directional outgoing flow of the expelled gases toward the gas outlet 35 and of the steam which is generated toward the steam outlet 34.

The low-pressure systems of modern heat recovery steam generators typically operate with the evaporator/steam drum system in a pressure range from 5, to 7 bar, up to at most 10 bar, and therefore at temperatures from 150 to 165° C. up to at most around 180° C. On account of the superatmospheric pressure prevailing in the degassing system, it is in principle possible for gas to be discharged from the low-pressure steam drum 21 via the gas outlet 35 into the environment without the need for auxiliary systems. Since steam also leaves the LP steam drum 21 with the gas, to avoid steam and water losses it is recommended to discharge the gases into the environment or into the condenser 11 via a special condenser.

Ultimately, with the degassing illustrated, it is impossible to avoid a certain loss of steam. However, to keep this loss of steam at a low level, the installation as a whole is preferably controlled and operated in such a way that the generation of steam in the evaporator 22 corresponds to the requirements of degassing. This is advantageously also achieved by partial or complete bypassing of the low-pressure economizer 15 and operation of the low-pressure steam drum 21 and low-pressure evaporator 22 system as a feedwater preheater. Controlled bypassing of the low-pressure economizer 15 causes cold feedwater to pass into the steam drum 21. This means that the steam which is generated in the low-pressure evaporator 22 serves primarily to heat the feedwater flowing into the low-pressure steam drum 21. Ideally, all the steam which is generated by the low-pressure evaporator 22 is used to preheat the feedwater in the steam drum 21. In this case, only the gases which have been expelled from the feedwater leave the LP steam drum 21 via the gas outlet 35. The degassing is particularly important if, for example, shutdown periods or special operating modes (addition of make-up water) have led to an increased gas content in the water-steam cycle WDKL. During normal operation, it is possible, at least for a limited time, to dispense with degassing in the LP steam drum 21. In this case, the jet injector system 38 is not operated. In a preferred embodiment of the process, therefore, the combined-cycle installation is operated with discontinuous degassing. In normal operation, the feedwater flows into the drum via the preheater, economizer, 15, and low-pressure saturated steam is generated for if appropriate further superheating and for feeding into the steam turbine. The gas outlet 35 of the drum is then closed by a shut-off member in a manner which is known per se, such that it is impossible for any steam to escape. In a further operating state, the installation is operated with degassing. The bypass of the economizer is controlled in such a way that at least the majority of all the steam which is generated in the evaporator 22 is used to preheat the feedwater; if appropriate, it is also possible for a shut-off member (not shown) to close the low-pressure live steam line or the flow path from the steam outlet 34 of the drum to the low-pressure superheater. The steam turbine is then temporarily operated without additional low-pressure live steam, which temporarily reduces the overall efficiency but compensates for this by suppressing loss of media from the water-steam cycle. The low-pressure evaporator system is temporarily operated as a feedwater vessel with integrated degassing and preheating function. During start-up or also for a certain time thereafter, it is possible for the LP steam system to be operated in degassing mode in order to maintain the water-chemistry operating mode. Downstream steam systems or pressure stages (as indicated in FIG. 1) are supplied with degassed feedwater from the LP steam drum 21. In the case of pressure stages which are connected in parallel, with separate feed to the steam systems or pressure stages, for example from the condenser 11, it is possible for the low-pressure evaporator system to be operated in the form of a bypass degassing means.

The degassing process according to the invention can also be carried out, for example, in a condenser or in a feedwater vessel. A condenser with integrated thermal degassing is diagrammatically depicted in FIG. 3. Expanded steam 10 flows into the steam volume 36 of the condenser. The heat-exchange surfaces of the condenser have steam on one side and coolant 12, for example air or cooling water, on the other side flowing through and around them. In the process, the steam is condensed, and condensate is to be found at the bottom of the condenser, forming the water volume. The condensate is fed back to the cycle via the condensate line 14 and the condensate pump 13. The nozzles 41 are arranged in the water volume; a pump 39 conveys condensate out of the water volume 39 to the water jet injector 40, where steam is sucked out of the steam volume 36 and mixed with the water, in the manner described above.

Figure 3:
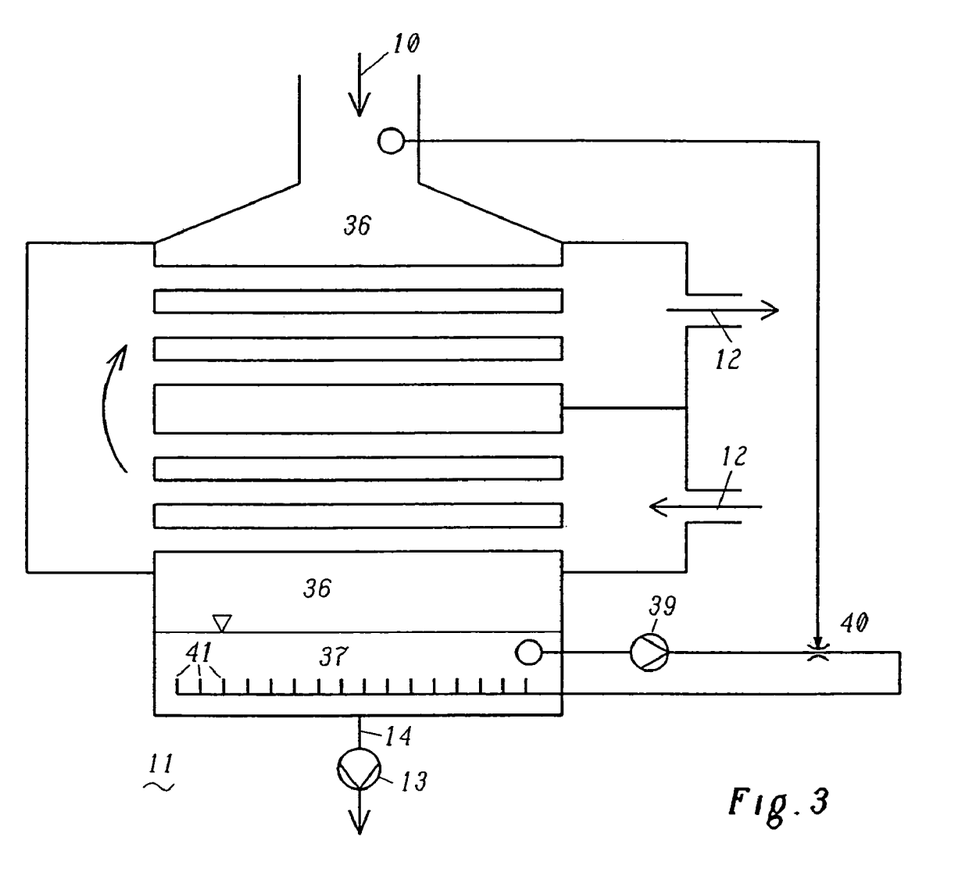
FIG. 3 shows a section through a condenser having means for thermal degassing.
Figure 4:
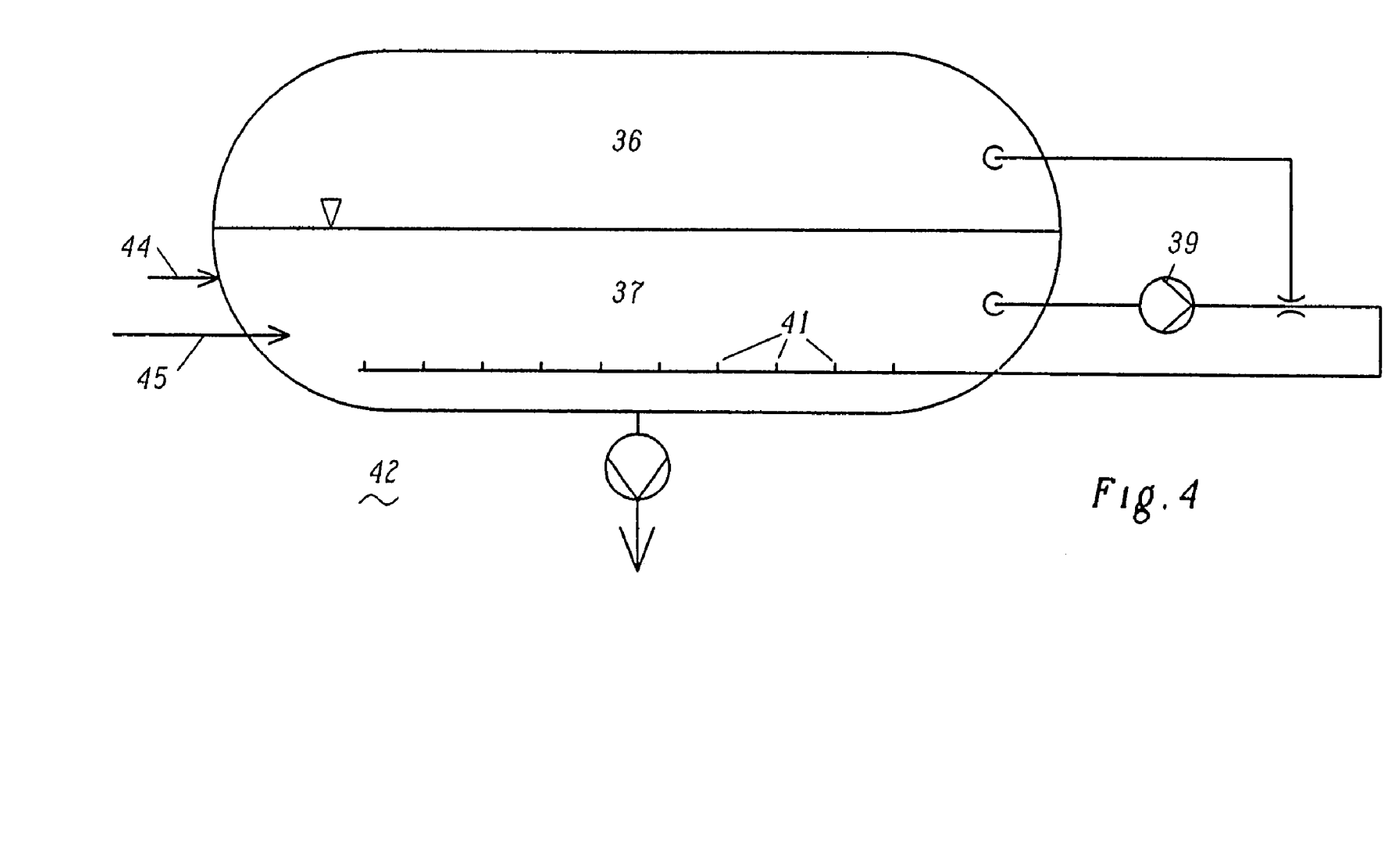
FIG. 4 shows a feedwater vessel with means for thermal degassing.

The water-steam mixture flows through the nozzles 41 into the water volume 37 and expels gases dissolved therein from the condensate. Finally, FIG. 4 shows a separate feedwater vessel 42, which is intended to carry out the process according to the invention. More detailed explanations in this respect are not required in view of the explanations which have already been provided above.

Obviously, numerous modifications and variations of the present invention are possible in light of the above teachings. It is therefore to be understood that within the scope of the appended claims, the invention may be practiced otherwise than as specifically described herein.

LIST OF DESIGNATIONS

1 Compressor
2 Combustion chamber
3 Gas turbine
4 Intake air
5 Combustion air
6 Hot gas
7 Exhaust gas
8 Heat recovery steam generator
9 Stack
10 Exhaust steam
11 Condenser
12 Cooling medium
13 Condensate pump
14 Feedwater line, feedwater
15 Low-pressure economizer, feedwater preheater
16 Control element
17 Control element
18 Bypass line
19 Feedwater line
20 Control element
21 Low-pressure steam drum
22 Low-pressure evaporator
22a Recirculation pump
23 Low-pressure superheater
24 Low-pressure live steam line
25 Feedwater line leading to further pressure stages
26 Feedwater pump
27 Control element
28 Economizer, feedwater preheater
29 Feedwater line leading to further pressure stages, feedwater
30 High-pressure live steam line
31 Medium-pressure live steam line
32 Feedwater inlet
33 Feedwater outlet
34 Steam outlet
35 Gas outlet
36 Steam volume
37 Water volume
38 Jet injector system
39 Pump
40 Water jet injector, jet pump
41 Two-fluid nozzle, two-phase nozzle
42 Feedwater vessel
43 Feedwater pump
44 Supply of feedwater into feedwater vessel
45 Supply of steam into feedwater vessel
47 Flow obstacle, chicane
GA Gas turbine assembly
DA Steam turbine assembly
G Generator
W Shaft
K Coupling
WDKL Water/steam cycle

What is claimed is:

1. A method for thermally degassing water in a water-steam cycle, the water-steam cycle including a water volume and a steam volume, the method comprising:
    extracting water from the water volume;
    extracting steam from the steam volume;
    admixing said water with said steam to form a two-phase mixture;
    feeding the resulting two-phase mixture into the water volume.

2. The method of claim 1, further comprising:
operating a jet injector as a jet pump in passing the extracted water through the jet pump as a motive fluid and sucking steam through a suction side of the jet pump.

3. The method of claim 1, further comprising:
setting the steam content of the two-phase mixture to a value in the range from 2% to 5%.

4. The method of claim 1, wherein the feeding comprises injecting the two-phase mixture into the water volume through nozzles.

5. The method of claim 1, wherein the feeding comprises injecting the two-phase mixture at an excess pressure of 1 to 2 bar.

6. The method of claim 1, further comprising:
temporarily interrupting degassing of the water.

7. The method of claim 1, wherein the steam volume is located immediately adjacent the water volume.

8. The method of claim 7, wherein the steam volume is located above the water volume.

9. The method of claim 1, wherein the steam volume and the water volume are contained in a common vessel.

10. A device for thermally degassing water in a water-steam cycle, the water-steam cycle including a water volume and a steam volume, the device comprising:
means for extracting water from the water volume;
means for extracting steam from the steam volume;
means for admixing said water with said steam to form a two-phase mixture;
means for feeding the resulting two-phase mixture into the water volume; and
a vessel with a plurality of nozzles arranged in a lower part of the vessel for introducing the two-phase mixture into the water volume.

11. A device for thermally degassing water in a water-steam cycle, comprising a vessel with a plurality of nozzles arranged in a lower part of the vessel, wherein the vessel comprises a water extraction point and a steam extraction point, and the device further comprises:
a pump having a suction side in fluid connection with the water extraction point and a pressure side in fluid connection with the nozzles; and
a water jet injector arranged as a jet pump in a flow path from the pump to the nozzles, and having a suction side connected to the steam extraction point.

12. The device of claim 10, wherein the vessel comprises a feedwater inlet and a feedwater outlet, and wherein the nozzles are arranged between the feedwater inlet and the feedwater outlet.

13. The device of claim 10, further comprising flow obstacles for improved mixing of the water in the water volume, the flow obstacles being arranged in a flow path from a feedwater inlet to a feedwater outlet.

14. A device for thermally degassing water in a water-steam cycle, comprising a vessel with a plurality of nozzles arranged in a lower part of the vessel, wherein the vessel comprises an inlet connected to an evaporator, a steam outlet, and an outlet for the extracted gases, with the inlet and the steam outlet being arranged in a first area of the vessel and the outlet for the extracted gases being arranged in a second area of the vessel different from the first area.

15. The device of claim 14, wherein the nozzles are arranged in a second area of the vessel.

16. The device of claim 10, wherein the nozzles are arranged in a lower half of the vessel.

17. The device of claim 10, wherein the nozzles are arranged in a lower third of the vessel.

18. The device of claim 10, wherein the vessel comprises a water extraction point and a steam extraction point, and the device further comprises:
a pump having a suction side in fluid connection with the water extraction point and a pressure side in fluid connection with the nozzles; and
a water jet injector arranged as a jet pump in a flow path from the pump to the nozzles, and having a suction side connected to the steam extraction point.

19. The device of claim 10, wherein the vessel comprises an inlet connected to an evaporator, a steam outlet, and an outlet for the extracted gases, with the inlet and the steam outlet being arranged in a first area of the vessel and the outlet for the extracted gases being arranged in a second area of the vessel different from the first area.

20. The device of claim 19, wherein the nozzles are arranged in a second area of the vessel.

* * * * *